2,803,691

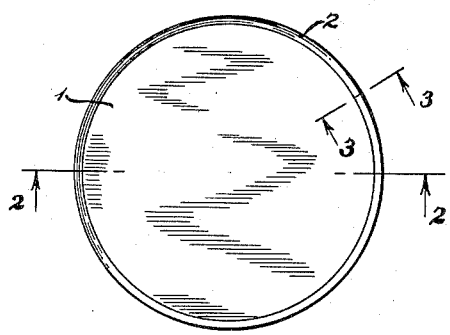
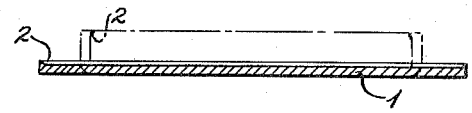
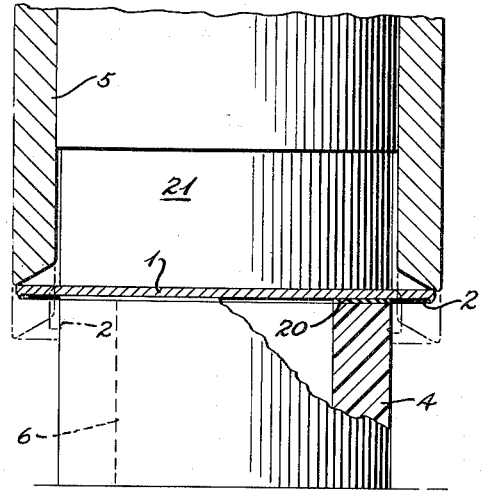
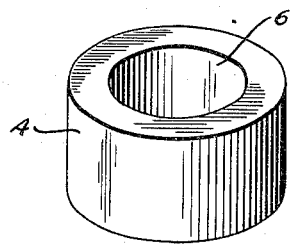
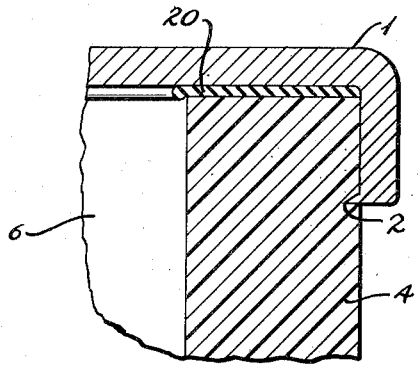
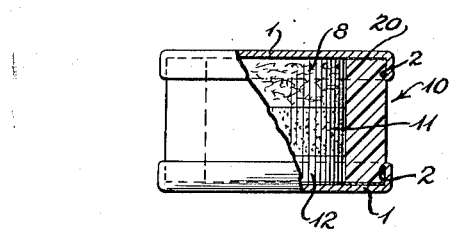
INVENTORS
William S. Herbert and
Daniel C. Oakley
BY Beale and Jones
ATTORNEYS

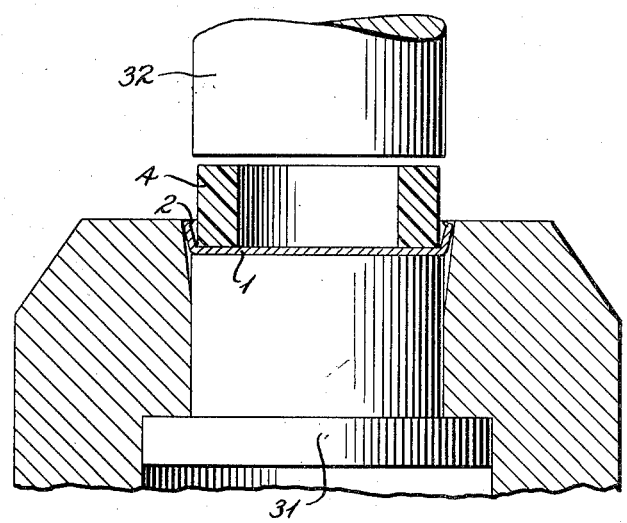
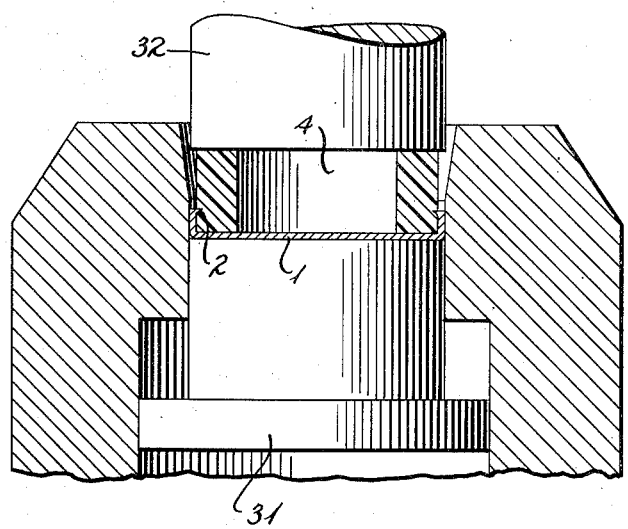
INVENTORS
William S. Herbert and
Daniel C. Oakley
BY Beale and Jones
ATTORNEYS

DRY CELL CONSTRUCTION

William S. Herbert, Madison, Wis., and Daniel C. Oakley, Clinton, Mass., assignors to Ray-O-Vac Company, Madison, Wis., a corporation of Wisconsin Application May 13, 1953, Serial No. 354,706

4 Claims. (Cl. 136—133)

This invention relates to a new type of construction for the closure of a dry cell.

In recent years the alkaline dry cell has achieved tremendous commercial importance. In a particular embodiment which is important commercially, the cell casing comprises three members: a cylindrical plastic receptacle, and two end caps secured to the opposite ends of the jacket. The plastic cylinder is shouldered at its ends, and the caps, which may be of the crown type similar to those used on soft drink bottles, are crimped around the shoulders. An annular seal or gasket between the cylinder ends and the caps achieves fluid tightness. Such a casing is disclosed in the copending application of W. S. Herbert, filed July 8, 1949, Serial No. 103,593.

The combination of the gasket rings, hollow cylinder and caps forms a hermetically-sealed chamber in which the active ingredients of the cell may be placed. Each cap is conductive and represents one electrode of the cell. Such a cell may be used alone, or in combination with a plurality of other such cells, in a common container or wrapper, to obtain batteries of any desired voltage. The individual cells may be made very small, so that a battery made from a plurality of such cells may be used in very small spaces, and yet provide long life and the desired capacity and voltage. Such batteries are ideally suited for hearing aids and other portable equipment.

However, the shouldered type of insulating cylinder or spool presents certain engineering problems. The use of the shouldered spool and crown cap in all cell sizes requires accurate matching of the dimensions of the shoulder and of the skirt portion of the cap in order that the crimp of the cap will be properly positioned on the contour of the shoulder so as to exert the lateral compressive force necessary to effectuate a seal. In addition, when thinner cells are desired, necessarily the skirt portion of the end caps must be made more narrow. This presents a practical limitation on the thinness of cells in which crown type caps can be employed since with each decrease in width of skirt it becomes increasingly more difficult to grip and bend the smaller metal surface to provide the necessary crimp.

The object of this invention is to provide a new type of cell construction in which the dimensional relationship between the cap and the insulating spool is not critical and wherein an effective seal can be attained in cells of minute dimensions.

A further object of the invention is to provide a new type of construction for all sizes of cells which will be simple, inexpensive, and efficiently produced. Still another object of the invention is to eliminate the scallops, characteristic of the crown type cap, which scallops add materially to the over-all cell dimension without contributing any corresponding increase in the capacity of the cell.

These and other objects of the invention are achieved by utilizing a hollow insulating body of plastic which is sealed by a novel type of cap. The new cap is stamped from a sheet in such a way as to provide a burr on the inner marginal edge of the cap. The cap is then pressed tightly onto and around the end of the insulating body. In doing so, the burr of the cap bites into the wall of the insulating body and provides a firm grip. During this operation the walls of the insulating body are compressed, but as the compressive force is removed, the elasticity of the plastic causes the walls to spring back to a greater extent than the spring-back of the skirt portion of the metal cap. Because of this combination biting-gripping action, the cap of the present invention is sometimes termed a bite-grip cap. This novel type of cap-insulator wall cooperation is an important part of the invention, and may be best understood by reference to the drawings.

Figure 1 is a top or plan view of the metal blank or disc showing the burr along the inner marginal edge of the cap.

Figure 2 is a partial side view of the blank showing the burr in profile.

Figure 3 is an expanded view of a section of the blank taken from Figure 1 along 3—3, to better illustrate the burred edge.

Figure 4 is a perspective view of a straight-sided insulating spool which may be used with the novel cap of the invention.

Figure 5 is a view in section of the apparatus in position for sealing the cap on one end of the spool.

Figure 6 is a side elevation, in partial cross-section, of a completed cell.

Figure 7 is an enlarged view of one end of the sealed spool.

Figures 8 and 9 are sectional views of one form of apparatus which may be used to apply the cap to the spool.

Referring now in greater detail to the drawings, the circumferential burr 2 around the cap 1 in Figure 1 is formed by punching the cap 1 from sheet stock with a punch having a bevelled edge of small radius. As the punch forces the cap blank 1 out of the sheet, a sharp edge or burr 2 is formed from the sheet and remains on an outer marginal surface of the cap blank 1. The sheet stock which is used may be plain steel, but preferably is nickel-plated steel, or tin-plated steel, if the cap is to be used in an alkaline cell. It will be understood that the caps may be formed of any metal which has the desired properties of conductivity and compatability with the cell components and also has sufficient hardness to cooperate with the selected plastic of the spool.

It may be helpful to illustrate by a specific example one manner in which the cap and burr may be formed on a piece of metal stock which is 0.008" thick. The cap blank is punched from the metal stock by a punch and die. The punch must have a bevelled cutting edge, and the die must be sharp. The punch may be about 0.003" to 0.005" smaller in diameter than the die diameter. When the cap blank is punched out, a lip or burr is produced. It is important for stock of this thickness that the burr at the circumference be knife-edged and about 0.002" to 0.007" in height. If the metal is thinned too much in forming the burr, the result may be a weak burr which will collapse rather than cut into the side of the plastic spool during crimping.

It is often preferable to form the cap blank 1 into a cap shape before crimping the cap onto spool 4. This may be done simply by placing the cap blank, with the burr side up, in a die which contains a pocket for centering the blank. The lower part of the die should be made to the same shape and dimensions as the outside of the bite-grip cap. The forming punch then pushes the metal into the lower part of the die and forms the cap. The forming punch should have a sharp edge so that the internal corner or radius of the cap will be as small or sharp as possible. The diameter of the forming punch determines the inside diameter of the cap, which is desirably substantially the same as the outside diameter of the insulating spool. If the cap blank is formed into a cap shape as just described, care must be taken that the burr is not damaged during the forming action.

Figure 4 shows the smooth-sided or straight-sided cylindrical insulating spool 4 which is preferably used in forming the novel cell. The hollow cavity in cylinder 4 may be formed by molding or casting the cylinder in individual units or by cutting off units from a cylindrical tube or stock. Alternatively, the units or stock may be molded or cast as a solid piece of plastic which is machined out to the desired shape and dimensions. It will be observed that cylinder 4 is extremely easy to manufacture to very close tolerances. It is a very simple component of the casing. While the configuration of the insulating body shown in Figure 4 is preferred due to its simplicity, it will be understood that various alternative forms may be used in accordance with the present invention so long as the burr of the cap bites into the plastic of the insulating body.

Figure 5 illustrates why the desired degree of resiliency in the spool 4 is essential to successful manufacture of the completed cell. The cap 1 is secured over the ends of the spool 4 by means of a die 5. The outer part of the die 5 has an inside diameter which is slightly smaller than the aggregate figure for the outside diameter of the plastic spool 4 plus twice the metal thickness of the cap 1. A spring loaded pressure pad 21 of the die 5 bears down on the central portion of the cap 1 during the crimping operation and insures that a gasket-forming layer of sealing compound 20 which has been applied to the cap is compressed and that cap 1 has a relatively flat outer surface; in other words, it prevents buckling. The die 5 moves down far enough to provide flush contact by folding the overlapping inner marginal edges of the cap 1 adjacent to the underlying surface of the spool 4. In this action the burr 2 is forced into biting engagement with the plastic side wall and the plastic spool 4 is radially compressed. As the die 5 moves upwardly, and eventually loses contact with the cap 1, the spool 4 tends to expand to its original dimensions. This spring back of the spool should be greater than the spring back in the cap so that the burr 2 continues to bite into the spool and holds the cap and spool in lateral compressed relationship. The sealing effect thus obtained, with the compression exerted on the annular gasket 20, is sufficient for fluid-tightness. The tight fit of the skirt of the cap and the biting action of the burr have been found additionally to provide sealing action.

Figure 7 is a much enlarged view of the spool 4 sealed by the cap 1. The indentation caused by the biting into the plastic by the burr 2 is shown on a greatly enlarged scale for clarity.

While various materials may be used to manufacture the plastic spool, it is desirable, as has already been pointed out, to carefully control the physical properties of the plastics. The modulus of elasticity and hardness appear to be the most important properties for this application. The plastics should have sufficient elasticity so that the spool will assume its original shape following the release of compression forces and thus compensate for any slight spring back in the skirt of the metal cap. The plastics should, in addition, be of such hardness as to permit the burr of the cap to bite into the plastic without flattening the burr. A preferred range of properties for the plastics is set forth in Table I.

*Table I*

Modulus of elasticity, $4 \times 10^5$ to $8 \times 10^5$ p. s. i.
Hardness, Rockwell M60 to M120 (¼″ ball, 100 kg. load)
Tensile strength, 6,000 to 12,000 p. s. i.
Compressive strength, 10,000 to 20,000 p. s. i.
Flexural strength, 10,000 to 20,000 p. s. i.

The properties of any individual plastic which may be considered for use in the spool may be obtained from the source of supply or from numerous texts. Poly-methyl methacrylate and polystyrene are eminently suitable plastics since they have the necessary hardness and elasticity. Ethyl cellulose is also suitable since it can be obtained in a range from very soft to a rigid form. Melamine formaldehyde, cast allyl resin, and the rigid polyesters are also hard enough. Nylon and hard rubber would also make suitable spools, although at present nylon is impracticable because of its high cost. Rigid vinyl resins would also be suitable, although they are difficult to extrude and are difficult to mold by injection. It will thus be seen that an extremely wide range of materials may be successfully used for the spool. It will also be understood that the properties of the metal used for the caps may influence the selection of particular plastics for the spool.

Figure 6 shows the new casing of this invention used with an alkaline cell. Within the hermetically sealed casing are the active ingredients of the alkaline cell. From the bottom up, these are: a zinc electrode 12, an electrolyte carrier 11, which may be an alkaline hydroxide electrolyte absorbed in a porous or fibrous wafer; and a mix cake 8 which may be a mixture of carbon and the oxides of mercury, manganese or the like, serving as electrode and depolarizer. Figure 6 has been inserted for purposes of illustration only, and it should be understood that this new cell construction is not limited in use to alkaline cells. It may be readily adapted for use with a Leclanché cell system or any other conventional cell system. It will be understood that with other types of cells a separate electrode may be utilized in contact with the mix 8 to protect the adjacent cell cap.

Figures 8 and 9 show another form of apparatus which may be used to seal the bite grip cap on the spool 4. For the apparatus shown here, the cap blank is preferably shaped into a cap shape before being crimped. This shaping may be done in any conventional manner, and may be done in the manner already described above. In Figure 8, the insulating spool 4 is shown resting on the cap 1, which in turn is resting on a spring loaded pressure pad 31 which protrudes into a tapered nest centered in the crimping die. The nest is so designed as to center the uncrimped cap and insulating spool. When they are centered, the punch 32 forces the assembly into the die. The pressure pad 31 is initially under tension so that the gasket ring (shown in detail as No. 20 in Figure 7) which is between spool 4 and cap 1, is compressed before the crimping or biting action occurs. After the initial pressure or tension has been overcome by the force of the punch, the assembly moves into the restricted portion of the die which forces the burr to bite into the plastic spool and thus holds the cap on the spool with the gasket compressed between them. As an illustration of the actual dimensions which may be involved, the restricted section of the die may be 0.01″ smaller in diameter than the cap diameter. The actual biting action takes place at the lowermost point in the downward movement of the punch 32 in the position shown in Figure 9.

When the assembly is released from the die shown in Figures 8 and 9, the elasticity of the metal cap makes it tend to spring back outwardly from the plastic spool. Since the spool has also been axially compressed, because the restricted portion of the die is less than the outside diameter of the spool plus twice the thickness of the metal cap, it will expand and will compensate for the elasticity of the metal cap. This action insures that the cap will continue to bite into the ring.

The spool 4 has been described throughout the specification as a hollow cylinder. The caps 1 have been described as formed from circular metal discs. However, it will be obvious that the invention is not restricted to use with cylindrical insulating spools and circular discs or caps. The bite-grip technique may be readily adapted in the manufacture of casings of square, triangular or other desired cross-section.

We claim:

1. The method of making a casing for a primary cell comprising shearing a disc of metal from a sheet, whereby a burr is obtained on one inner marginal surface, forming a hollow cylinder of plastic material, centering the disc over the cylinder end, the overhanging flange with the burred inner surface being toward the cylinder, forcing the burr of the overhanging flange into biting engagement with the cylinder wall, and simultaneously radially compressing the cylinder wall, and then releasing the compression to secure the metal disc in the form of a cap over the end of the cylinder.

2. The method of making a casing for a primary cell comprising shearing a disc of metal from a sheet, whereby a burr is obtained on one inner marginal surface, preforming said disc into a cap having an extending cylindrical skirt whereby said burr is retained and directed inwardly along the peripheral edge of said skirt, forming a hollow cylinder of plastic material, placing the preformed cap over the cylinder end with the cylindrical skirt fitting around the cylinder, forcing the burr of the cap into biting engagement with the cylinder wall and simultaneously radially compressing the cylinder wall, and then releasing the compression to secure the cap over the end of the cylinder.

3. The method of claim 2 wherein a resilient sealing gasket is positioned over the end of the hollow plastic cylinder before the preformed cap is placed thereover.

4. The method of claim 2 wherein the plastic material of the hollow cylinder has a modulus of elasticity in the range of $4 \times 10^5$ p. s. i. to $8 \times 10^5$ p. s. i. and a Rockwell hardness in the range from M60 to M120, as measured with a ¼ inch ball and 100 kg. load.

References Cited in the file of this patent

UNITED STATES PATENTS

| | | |
|---|---|---|
| 1,920,151 | Ruben | July 25, 1933 |
| 2,063,524 | Ruben | Dec. 8, 1936 |
| 2,582,973 | Ellis | Jan. 22, 1952 |
| 2,650,945 | Herbert | Sept. 1, 1953 |